United States Patent [19]
Loftin

[11] Patent Number: 5,300,538
[45] Date of Patent: Apr. 5, 1994

[54] SOLID MARKING COMPOSITIONS

[75] Inventor: Rachel M. Loftin, Halifax, Mass.

[73] Assignee: The Gillette Company, Boston, Mass.

[21] Appl. No.: 892,181

[22] Filed: Jun. 2, 1992

[51] Int. Cl.$^5$ .................... C09D 13/00; C08L 53/02; C08L 91/06

[52] U.S. Cl. .................... 523/161; 523/164; 524/275; 524/277; 524/278; 524/279; 524/487; 524/488; 524/489

[58] Field of Search ................ 523/161, 164; 524/275, 524/277, 278, 279, 487, 488, 489; 428/195, 205

[56] References Cited

U.S. PATENT DOCUMENTS

| | | | |
|---|---|---|---|
| 257,706 | 5/1882 | Horne . | |
| 394,937 | 12/1888 | Requa . | |
| 2,380,126 | 7/1945 | Sturm | 260/738 |
| 2,560,195 | 7/1951 | Smith et al. | 154/139 |
| 3,392,123 | 7/1968 | Winberg | 252/188.3 |
| 3,766,114 | 10/1973 | Walker | 524/488 |
| 3,814,526 | 6/1974 | Lotfallah | 401/199 |
| 3,917,607 | 11/1975 | Crossland | 524/487 |
| 3,949,132 | 4/1976 | Seregely et al. | 428/207 |
| 4,256,494 | 3/1981 | Yamamoto et al. | 106/22 |
| 4,297,260 | 10/1981 | Ferree, Jr. et al. | 260/29.7 |
| 4,329,262 | 5/1982 | Muller | 523/161 |
| 4,349,639 | 9/1982 | Muller | 523/161 |
| 4,357,431 | 11/1982 | Murakami | 524/275 |
| 4,389,499 | 6/1983 | Riesgraf | 523/161 |
| 4,390,646 | 6/1983 | Ferguson | 523/161 |
| 4,391,927 | 7/1983 | Farmer | 523/161 |
| 4,539,364 | 9/1985 | Pollet | 524/488 |
| 4,629,748 | 12/1986 | Miyajima et al. | 523/161 |
| 4,659,760 | 4/1987 | van der Meer | 524/487 |
| 4,687,791 | 8/1987 | Miyajima et al. | 523/161 |
| 4,721,739 | 1/1988 | Brenneman et al. | 523/161 |
| 4,738,725 | 4/1988 | Daugherty et al. | 106/308 |
| 4,760,104 | 7/1988 | Miyajima et al. | 523/161 |
| 4,857,594 | 8/1989 | Lakshmann | 524/487 |
| 4,918,130 | 4/1990 | Kano | 524/487 |
| 4,940,628 | 7/1990 | Lin et al. | 428/207 |
| 4,954,174 | 9/1990 | Imagawa | 106/27 |
| 4,960,464 | 10/1990 | Chen | 106/19 |
| 4,988,123 | 1/1991 | Lin et al. | 281/15.1 |
| 4,992,502 | 2/1991 | Loftin et al. | 524/277 |
| 5,001,179 | 3/1991 | Kauffman | 524/488 |
| 5,004,763 | 4/1991 | Imagawa | 523/161 |
| 5,021,257 | 6/1991 | Foster | 524/488 |
| 5,026,752 | 6/1991 | Wakabayashi | 524/488 |

Primary Examiner—Paul R. Michl
Assistant Examiner—Olga Asinovsky
Attorney, Agent, or Firm—Fish & Richardson

[57] ABSTRACT

An erasable highlighting composition is provided including a block copolymer, a wax, and a fluorescent pigment. The composition is in solid form, and, when applied to an underlying marking on a substrate, is capable of forming a highlighting marking which may be erased without lifting the underlying marking.

26 Claims, No Drawings

SOLID MARKING COMPOSITIONS

BACKGROUND OF THE INVENTION

This invention relates to marking compositions.

Traditionally, marking compositions, e.g., highlighting inks, writing inks, and correction fluids, have been provided in liquid form, as solvent-based or aqueous solutions. These solutions suffer from various disadvantages, including drying too slowly or too quickly and settling of suspended pigments. There also are environmental and/or safety concerns caused by solvent use.

Additionally, the use of a liquid marking composition requires that the composition be supplied in a marking pen or other dispenser. Typically pens and other ink dispensers are disposable, creating waste when the ink supply is exhausted.

Certain marking compositions (see, e.g., U.S. Pat. No. 2,380,126), and correction compositions (see, e.g., U.S. Pat. No. 4,992,502) have been provided as solid wax crayons.

SUMMARY OF THE INVENTION

The invention features erasable marking compositions, in solid form, which can be applied to paper substrates to provide an erasable marking.

One aspect of the invention features a solid erasable marking composition that includes a block copolymer, a wax, and a colorant, e.g., a pigment or oil-soluble dye. The composition is provided in solid form and forms an erasable marking when applied to a substrate.

Another aspect of the invention features an erasable highlighting composition including a block copolymer, a wax, and a fluorescent pigment. The composition is in solid form, and, when applied to an underlying marking on a substrate, is capable of forming a highlighting marking which may be erased without lifting the underlying marking.

Preferred block copolymers are styrene-ethylene/butylene-styrene (S-EB-S) block copolymers and styrene-isoprene-styrene (S-I-S) block copolymers, with S-EB-S copolymers being more preferred. It is preferred that the copolymer have a melting temperature of less than about 180° C. Preferably the composition contains from approximately 2 to 20, and more preferably 6 to 16 weight percent of the block copolymer.

Preferred waxes include microcrystalline waxes, beeswax, carnauba wax, cetyl esters wax, cocoa butter and mixtures thereof. Mixtures of waxes are typically preferred, as more balanced properties, e.g. hardness, spreadability, and adhesion, can be obtained from a blend of waxes than from any single wax.

In some preferred embodiments, the marking composition further includes an oil, such as linseed oil, mineral oil, or silicone oil, and a semisolid hydrocarbon softening agent such as petrolatum. The preferred compositions may also include a fatty acid, more preferably stearic acid.

Another aspect of the invention features a method of making a solid, erasable marking composition. The method includes (a) mixing a pigment into an oil; (b) heating a wax with a block copolymer until both are melted, forming a clear molten liquid; and, (c) adding the mixture of step (a) to the mixture of step (b) and mixing until homogeneous. In preferred embodiments, the method further includes pouring the mixture of step (c) into a mold and allowing it to solidify, and the wax and block copolymer are stirred during melting.

Another aspect of the invention features a method of making a marking on a substrate. The method includes providing a composition of the invention, in the form of a solid stick, and pressing the stick against a surface of the substrate to apply a thin film of the composition to the surface, forming a marking. In preferred embodiments, the composition includes a fluorescent pigment, and is applied to an underlying marking on the surface to highlight the underlying marking; and the method further includes the step of erasing the marking.

The term "block copolymer", as used herein, refers to a polymer built of linearly linked polymeric units, prepared by the polymerization of a plurality of different monomers.

The term "wax", as used herein, refers to a substance having a crystalline to microcrystalline structure, a capacity to acquire gloss when rubbed, a capacity to produce pastes or gels with suitable solvents or when mixed with other waxes, and a low viscosity just above the melting point. (Grant & Hackh's Chemical Dictionary, Fifth Edition). The wax may be a single natural or synthetic substance, or a homogeneous blend of a plurality of waxes.

The term "erasable", as used herein, refers to a marking which can be substantially completely removed from a paper substrate using a conventional eraser.

The solid marking compositions of the invention are readily erasable with a conventional eraser, and advantageously neither include any solvent, nor require solvent for their manufacture. The compositions do not necessitate the use of a disposable pen, and eliminate the waste encountered in the manufacture of inks, as any scrap material can be melted and reused. In the case of the highlighting compositions, the highlighting marking is easily erased by a conventional eraser, without lifting or obliterating the underlying marking or type.

Other features and advantages of the invention will be apparent from the description of the preferred embodiment thereof, and from the claims.

DESCRIPTION OF THE PREFERRED EMBODIMENT

The preferred marking composition is a solid highlighting composition which includes a block copolymer, a blend of waxes, a fluorescent pigment, an oil, a fatty acid, e.g., stearic acid, and a softening agent.

The erasability of the composition is provided by the block copolymer. Suitable copolymers are those which may be melt processed, i.e., can be processed by melting alone, without the addition of volatile organic solvents. The preferred copolymers are available from Shell Chemical Co. of Houston, TX, under the tradename KRATON ™. Particularly preferred are KRATON styrene-ethylene/butylene-styrene copolymers, e.g. KRATON G 1650 and G1652, for optimum erasability and melt processability. Normally, the compositions will include between about 5% and 20%, more preferably between about 5% and 16% of the block copolymer by weight. Too little block copolymer may prevent the composition from erasing properly, while too much may make the composition in stick form less spreadable on the paper substrate.

The wax component preferably comprises a blend of waxes. The wax blend preferably has a melting temperature between about 50° C. and 80° C., while the melting temperatures of the individual waxes can range between about 20° C. and 90° C. For example, cocoa butter has a melting temperature between 22° C. and 24° C., while carnauba wax has a melting temperature between 86° C. and 88° C. Preferred compositions include from approximately 40 to 55 weight percent of the wax. Suitable components of the blend include but are not limited to microcrystalline waxes (also referred to in the art as "plastic waxes"), beeswax, carnauba wax, cetyl esters wax, and cocoa butter. The compositions normally include from about 40% to 55%, preferably from about 45% to 50% of the wax blend by weight. A preferred wax blend includes microcrystalline wax, carnauba wax, and cetyl esters wax, preferably in a ratio of 2:1:1. Too much wax in the composition may cause poor erasability, while too little may cause poor spreadability.

Suitable colorants include pigments, including those which are dispersible in waxes and/or oils, and oil soluble dyes. The colorant may be selected to provide an erasable marker, e.g., conventional pigments used in inks, or an erasable highlighter, e.g., fluorescent pigments. Normally, the compositions will include between about 4% and 20%, more preferably between about 6% and 10% of the pigment by weight. Too little pigment may provide inadequate color intensity, whereas too much may make the crayon crumbly.

Suitable oils include, but are not limited to, linseed oil, mineral oil, silicone oil and mixtures thereof. Generally, any oil which will not scorch or burn at the melting point of the block copolymer will be suitable. The oil component is used to form a uniform dispersion of the pigment, which can be incorporated into the molten wax and rubber without scorching and discoloration of the pigment. Silicone oil is preferred, as it also facilitates erasure of the composition without lifting underlying markings or type. Normally, the compositions will include between 5% and 20%, more preferably between about 10% and 15% of the oil by weight. Too much oil may cause the stick to be too soft and may cause smearing during erasing, while too little may make it difficult to form a pigment dispersion.

The fatty acid may be any fatty acid, e.g. stearic acid. The fatty acid increases the hardness of soft waxes, making the composition more readily erasable without smearing. Normally, the compositions will include between about 10% and 25%, more preferably about 12% and 20% of the fatty acid. Too much fatty acid may cause the stick to be too hard, while too little may cause smearing of the composition during erasing.

The softening agent is a semisolid hydrocarbon, preferably petrolatum or natural or synthetic lanolin. This component improves the spreadability of the solid composition over underlying print, where the composition is used as a highlighting stick, and is an optional component. The softening agent also allows the composition to be easily spread on a variety of different paper surfaces. If a softening agent is used, the composition will normally include between about 1% and 10%, more preferably between about 3% and 7% of the softening agent. Too much softening agent may result in a smeary, excessively soft composition.

The compositions are preferably made by first mixing the pigment into the oil, then heating the wax, or waxes, with the block copolymer, with stirring, until both are melted, forming a clear molten liquid, and, finally, adding the pigment/oil mixture to molten liquid and mixing until homogeneous. To form the marker, the homogeneous mixture is poured into a mold and allowed to solidify. The molds are preferably first treated with a release agent, e.g., potassium stearate, to facilitate removal of the solidified composition.

EXAMPLE

An erasable stick was made using the formula shown in Table 1. First, the pigment was mixed with the silicone oil to form a uniform pigment dispersion. Next, the waxes and stearic acid were melted together at about 175° C. and mixed, and the block copolymer added, melted and mixed, until the waxes and copolymer formed a homogeneous molten blend. The pigment dispersion, wax/copolymer blend, and petrolatum were then mixed together until uniform, and the resulting mixture poured into molds dusted with a release agent (potassium stearate) and allowed to solidify.

The erasable stick thus formed applied smoothly and easily to a paper substrate, and erased with a conventional eraser without smearing.

TABLE 1

| Component | Parts by Weight |
|---|---|
| BOWAX 1018 microcrystalline wax | 8 |
| Carnauba wax | 4 |
| Stearic acid | 4 |
| Cetyl esters wax | 4 |
| Silicone oil | 3 |
| KRATON 1650 block copolymer | 3 |
| LUMOGEN yellow pigment | 3 |
| Petrolatum | 1 |

Other embodiments are within the claims.

I claim:

1. A method of making a solid, erasable marking composition comprising the steps of (a. mixing a pigment into an oil; (b) heating a wax with a block copolymer until both are melted, forming a clear molten liquid; and (c) adding the mixture of step (a) to the mixture of step (b) and mixing until homogeneous.

2. The method of claim 1, further comprising pouring the mixture of step (c) into a mold and allowing it to solidify.

3. The method of claim 1 further comprising the step of stirring the wax and block copolymer during melting.

4. A method of making a marking on a paper substrate, including the steps of providing an erasable solid stick composition comprising a block copolymer, a wax and a pigment, and pressing said solid stick composition against a surface of the substrate to apply a thin film of the composition to the surface, forming an erasable marking.

5. The method of claim 4 wherein the pigment comprises a fluorescent pigment.

6. The method of claim 5 wherein the composition is applied to an underlying marking on the surface to highlight the underlying marking.

7. The method of claim 4 wherein the method further includes the step of erasing the marking.

8. The method of claim 4 wherein said block copolymer is a styrene-ethylene/butylene/styrene copolymer.

9. The method of claim 4 wherein said composition comprises from approximately 5 to 20 weight percent of said block copolymer.

10. The method of claim 4 wherein said wax is selected from the group consisting of microcrystalline waxes, beeswax, carnauba wax, cetyl esters wax, cocoa butter and mixtures thereof.

11. The method of claim 10 wherein said wax comprises a mixture of waxes having a melting temperature of from about 50° C. to 80° C.

12. The method of claim 10 or 11 wherein said mixture comprises microcrystalline wax, carnauba wax, and cetyl esters wax.

13. The method of claim 12 wherein said microcrystalline wax, carnauba wax, and cetyl esters wax are present in a ratio of about 2:1:1.

14. The method of claim 4 wherein said composition comprises from approximately 40 to 55 weight percent of said wax.

15. The method of claim 4 wherein said composition further comprises an oil.

16. The method of claim 15 wherein said oil is selected from the group consisting of linseed oil, mineral oil, silicone oil, and mixtures thereof.

17. The method of claim 16 wherein said oil is silicone oil.

18. The method of claim 15 wherein said composition comprises from approximately 10 to 15 weight percent of said oil.

19. The method of claim 4 wherein said composition further comprises a semisolid hydrocarbon softening agent.

20. The method of claim 19 wherein said softening agent is petrolatum.

21. The method of claim 19 wherein said composition comprises from approximately 1 to 10 weight percent of said softening agent.

22. The method of claim 4 wherein said composition further comprises a fatty acid.

23. The method of claim 22 wherein said fatty acid comprises stearic acid.

24. The method of claim 23 wherein said composition comprises from approximately 10 to 25 weight percent of said stearic acid.

25. The method of claim 4 wherein said colorant is a fluorescent pigment.

26. The method of claim 4 or 25 wherein said composition comprises from about 4 to 20 weight percent of said colorant.

* * * * *

UNITED STATES PATENT AND TRADEMARK OFFICE
CERTIFICATE OF CORRECTION

PATENT NO. : 5,300,538
DATED : April 5, 1994
INVENTOR(S) : Rachel M. Loftin

It is certified that error appears in the above-indentified patent and that said Letters Patent is hereby corrected as shown below:

Column 4, line 35 "a." should be --(a)--.

Signed and Sealed this

Fifth Day of March, 1996

Attest:

BRUCE LEHMAN

*Attesting Officer*   *Commissioner of Patents and Trademarks*